United States Patent
Ehrlich et al.

(10) Patent No.: US 6,370,161 B1
(45) Date of Patent: Apr. 9, 2002

(54) TIME SYNCHRONIZATION OF DISTRIBUTED COMPUTER TELEPHONY COMMUNICATION APPLICATIONS IN A COMPUTER NETWORK

(75) Inventors: Jason K. Ehrlich, Pleasanton; Paul E. Matz, San Francisco; Rajeev D. Pitre, Cupertino, all of CA (US)

(73) Assignee: Aspect Communications, San Jose, CA (US)

( * ) Notice: Subject to any disclaimer, the term of this patent is extended or adjusted under 35 U.S.C. 154(b) by 0 days.

(21) Appl. No.: 09/082,250

(22) Filed: May 20, 1998

(51) Int. Cl.[7] .................................................. H04J 3/06
(52) U.S. Cl. ...................................... 370/516; 709/248
(58) Field of Search .................................. 370/352, 353, 370/354, 355, 356, 401, 432, 503, 516, 517, 518, 519, 507; 325/354, 355, 356; 709/248

(56) References Cited

U.S. PATENT DOCUMENTS

| | | | | |
|---|---|---|---|---|
| 5,062,104 A | * | 10/1991 | Lubarsky et al. | 370/466 |
| 5,477,531 A | * | 12/1995 | McKee et al. | 370/249 |
| 6,026,080 A | * | 2/2000 | Roy | 370/260 |
| 6,104,729 A | * | 8/2000 | Hellum et al. | 370/503 |

\* cited by examiner

Primary Examiner—Kwang B. Yao
(74) Attorney, Agent, or Firm—Blakely, Sokoloff, Taylor and Zafman LLP

(57) ABSTRACT

A method for time synchronization of a plurality of telephony application units in a computer network retrieves a master clock value from a master telephony application unit configured to establish communication between two or more individuals and synchronizes a client clock value of a telephony application unit with the master clock value. Each of the plurality of telephony application unit is coupled to the master telephony application unit and is also configured to establish communication between two or more individuals.

28 Claims, 7 Drawing Sheets

TIME SYNCHRONIZATION OF DISTRIBUTED COMPUTER TELEPHONY COMMUNICATION APPLICATIONS IN A COMPUTER NETWORK

BACKGROUND OF THE INVENTION (1) Field of the Invention

The present invention is related to the field of computer networks, more specifically, the method and apparatus of the present invention is time synchronization of distributed computer telephony communication applications.

(2) Related Art

Systems are available for providing communication between two or more individuals. One such system is a computer network coupling two or more telephony application units running distributed computer telephony communication applications. Currently available distributed computer telephony communication applications include the Automatic Call Distributor (ACD) from Aspect Telecommunications, Inc. of San Jose, Calif. Distributed computer telephony communication applications support telephone as well as Intranet/Internet communication between individuals in a computer network and may be used in various business settings. For example, businesses may implement distributed computer telephony communication applications for use by customer representatives (agents) ready to respond to telephonic customer inquiries and able to share information with other customer representatives (agents) within a company.

Distributed computer telephony communication applications also support time dependent processing. For example, real-time telephony data gathered may be time stamped for further processing. Additionally, events may be scheduled for processing at pre-determined times. In an information sharing environment supporting time dependent processing, it is pertinent that each distributed computer telephony communication application running within a computer network be time and date synchronized.

Currently available distributed computer telephony communication applications do not utilize any method of time synchronization and therefore, events which are time-driven may occur out of synchronization and real-time telephony information gathered and processed may have discrepant timestamps amongst two or more telephony application units.

It is therefore desirable to have a method and apparatus for synchronizing distributed computer telephony communication applications in a computer network.

BRIEF SUMMARY OF THE INVENTION

The present invention is a method and apparatus for synchronizing distributed computer telephony communication applications. The present invention enables the creation of easier and better consolidated reports. In addition, the present invention enables accurate clock values on each telephony application unit in a computer network.

In one embodiment, the method of the present invention retrieves a master clock value from a master telephony application unit. The master telephony application unit is configured to establish communication between two or more individuals and synchronizes a client clock value of a client telephony application unit with the master clock value. Each of the multiple telephony application units is coupled to the master telephony application unit and is also configured to establish communication between two or more individuals.

BRIEF DESCRIPTION OF THE DRAWINGS

The present invention is illustrated by way of example in the following drawings in which like referenced indicate similar elements. The following drawings disclose various embodiments of the present invention for purposes of illustration only and are not intended to limit the scope of the invention.

DETAILED DESCRIPTION OF THE INVENTION

The present invention is a method and apparatus for synchronizing distributed computer telephony communications applications. The present invention enables the creation of easier and better consolidated reports. In addition, the present invention enables accurate clock values on each telephony application unit in a computer network.

Figure 1:
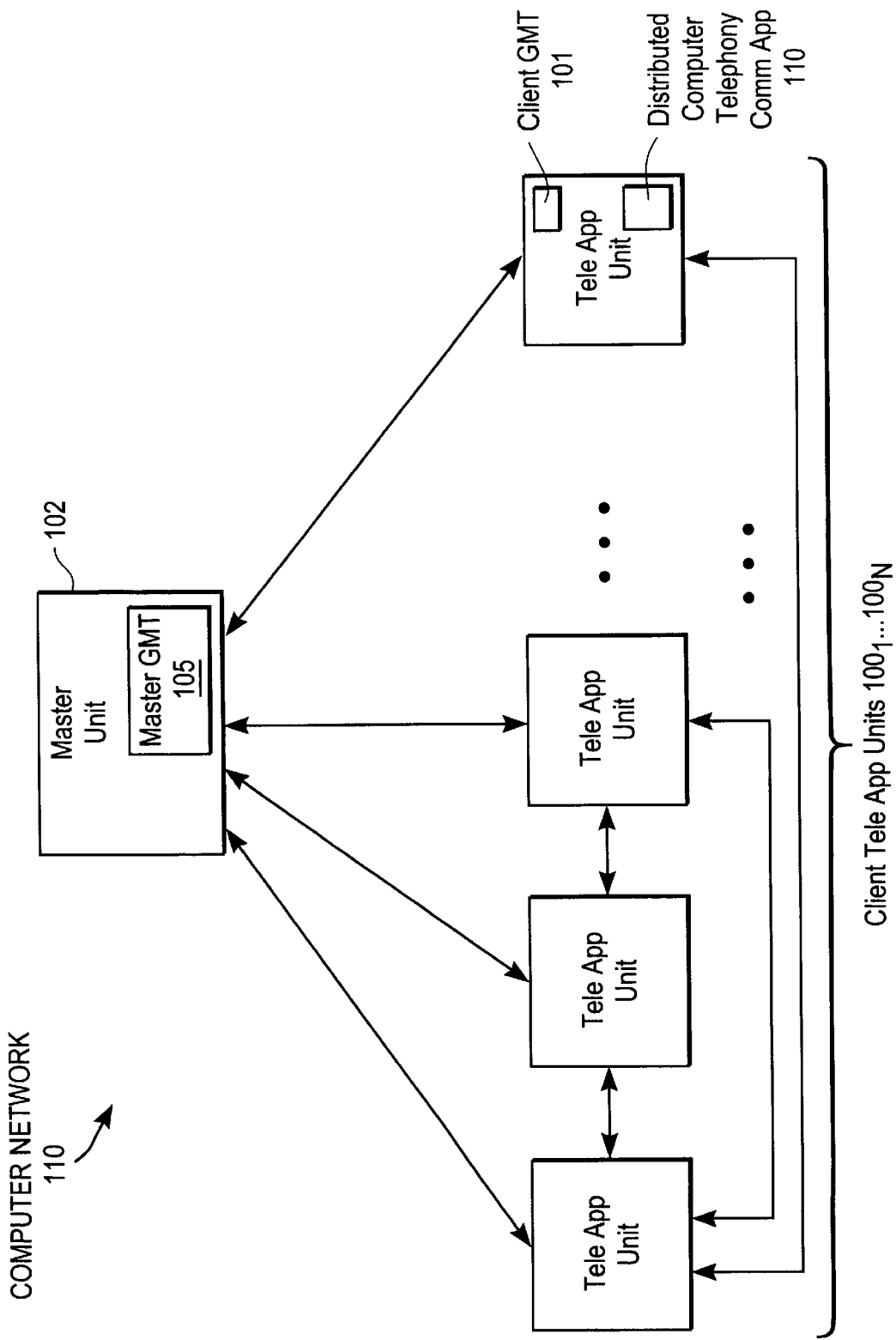
FIG. 1 illustrates an embodiment of a system capable of implementing the present invention.

FIG. 1 illustrates an exemplary system capable of implementing the present invention. The embodiment has a computer network 110 coupling a plurality of client telephony application units $100_1$ to $100_n$. The client telephony application units $100_1$ to $100_n$ are coupled to each other through a network link, for example, in a wide area network (WAN). A WAN is a computer network designed to serve a geographic area larger than that served by a local area network (LAN) and that may use or provide public communication facilities. A LAN is a computer network located on a user's premises within a limited geographical area.

Each telephony application unit has a distributed computer telephony communications application 110 configured to support telephony communication, including but not limited to real-time telephony data retrieval and transmittal and real-time telephony data event recordation. A distributed computer telephony communication application 110 utilizes the system clock (not shown) of the telephony application unit 100 it resides on as a time reference for time stamping real-time telephony data and events.

In one embodiment of the invention, the distributed computer telephony communications application 110 is an Automatic Call Distributor (ACD) available through Aspect Telecommunications, Inc. of San Jose, Calif.

Each telephony application unit including the client telephony application units $100_1$ to $100_n$ and the master telephony application unit 102 has a system clock represented in Greenwich Mean Time (GMT) and a local time. Both are maintained by an operating system (OS) (not shown) of the corresponding telephony application unit.

With the present invention, the time utilized by the distributed computer telephony communication application 110 on each telephony application unit is synchronized with the time utilized by the master telephony application unit 102. In one embodiment, the client telephony application unit 100 retrieves the master system clock time represented in GMT (hereinafter referred to as a master GMT) 105 of the master telephony application unit 102 through a predetermined communication port on the master telephony application unit 102 using Advanced Research Projects Agency (ARPA) Internet Time Protocol as per Request For Comments (RFC) 868. A computer supporting the Internet Time Protocol is configured to return a system clock time represented in GMT. The client system clock time represented in GMT (hereinafter referred to as a client GMT) 101 of the client telephony application unit 100 is then synchronized with the master GMT 105. The local time of the client telephony application unit 100 is then calculated by the operating system based on the updated client GMT 101. It is assumed here that the master GMT 105 of the master telephony application unit 102 is always accurate. GMT is a standard derived from the local clock of the United Kingdom (UK), and is well-known in the art.

In alternate embodiments, the master telephony application unit 102 is any type of computer configured to support Internet Time Protocol for a communication port configured to return GMT clock time. Although the Internet Time Protocol is provided as an example, those of ordinary skill in the art will appreciate that other protocols may be used with the present invention.

Figure 2:
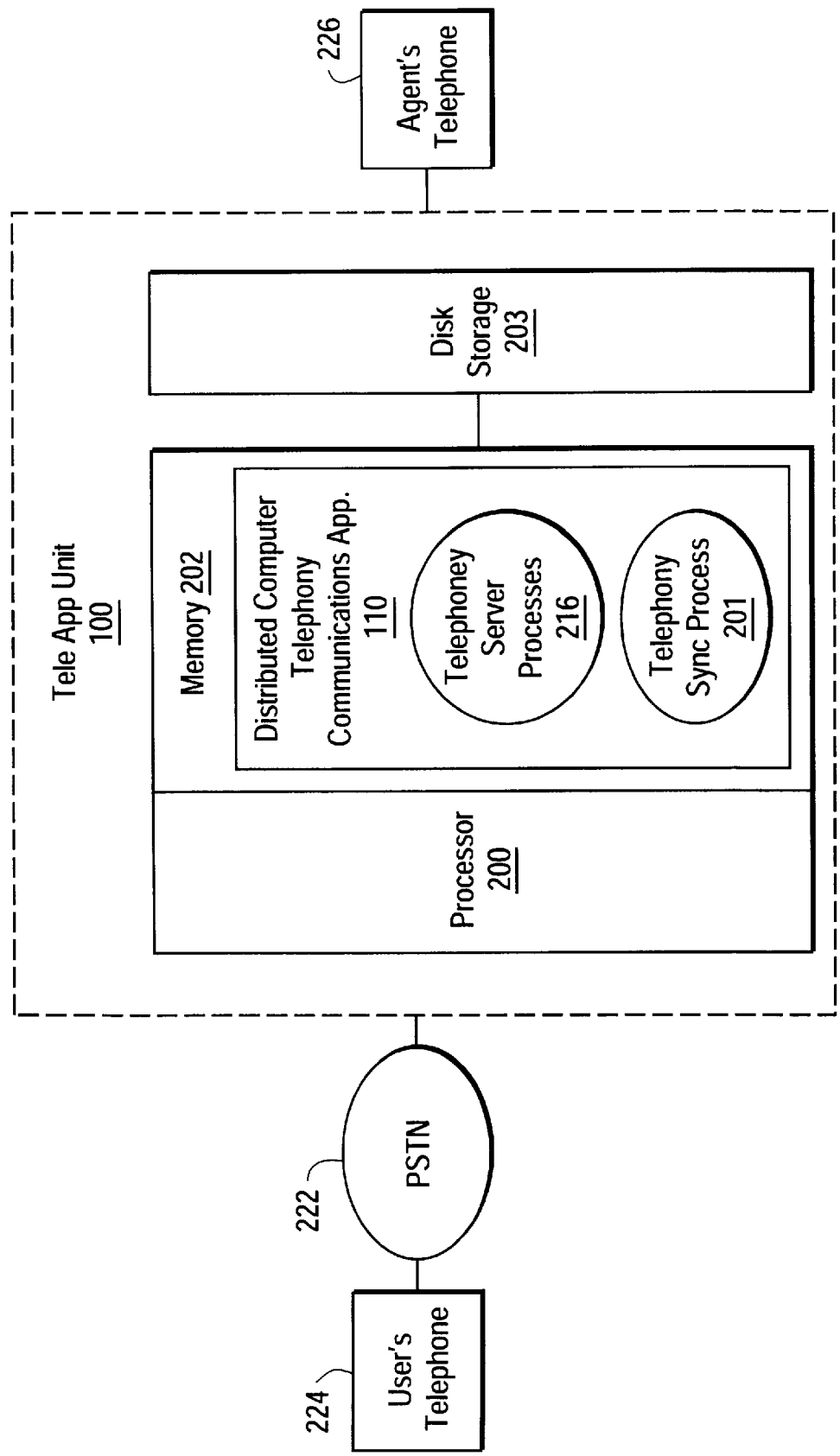
FIG. 2 illustrates a block diagram of an exemplary telephony application unit.

FIG. 2 is a further illustration of a telephony application unit of the present invention in an embodiment of a system capable of implementing the present invention. A telephony application unit 100 of the present invention has a disk storage 203 and a processor 200 coupled to a memory 202. The memory 202 contains a distributed computer telephony communication application software 110. The distributed computer telephony communication application 110 has a telephony application synchronization (telephony sync) process 201 configured to synchronize a client GMT 101 of the telephony application unit 100 with a master GMT 105 of a master telephony application unit 102.

The distributed computer telephony communication application 110 also has telephony server processes 216 configured to support processing of incoming telephone calls and placement of outbound telephone calls using, for example, a public switched telephone network (PSTN) 222. A user's telephone 224 is also coupled to PSTN 222 for communicating with the telephony application unit 100. In a particular embodiment of the invention, the telephony application unit 100 is capable of handling hundreds or thousands of incoming and/or outgoing calls across PSTN 222. The telephony application unit 100 is also coupled to an agent's telephone 226, which allows an agent to communicate through the telephony server process 216 and PSTN 222 to user's telephone 224.

Although FIG. 2 is illustrated with a single telephone 226 for purposes of explanation, it will be appreciated that a particular call processing system may have hundreds or thousands of agents, and corresponding telephones for each agent.

Figure 3:
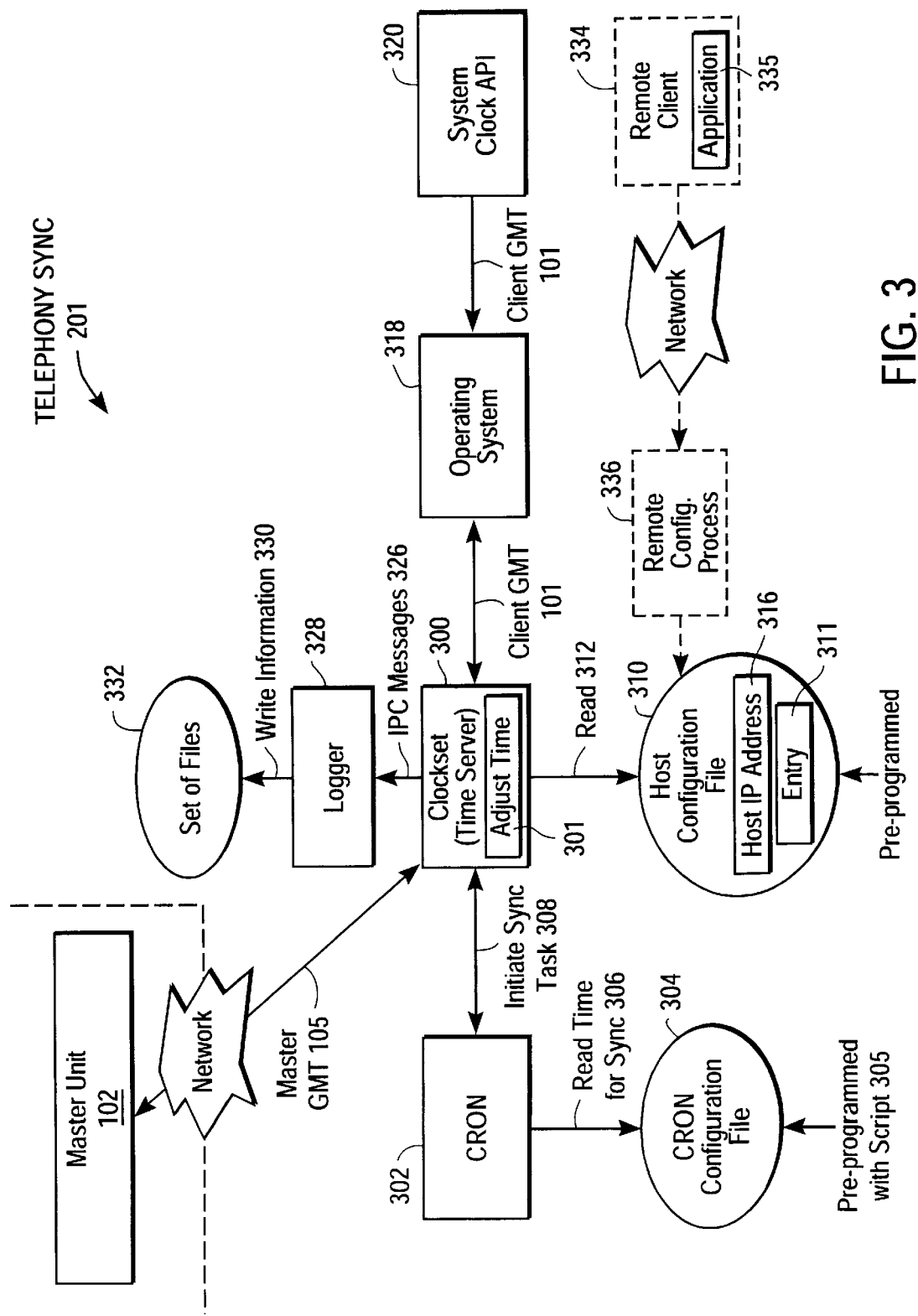
FIG. 3 illustrates an exemplary block diagram of processes and files configured to synchronize a client system clock in Greenwich Mean Time (GMT) of a client telephony application unit in a computer network.

FIG. 3 illustrates an exemplary block diagram of the telephony sync 201 of the present invention. In the illustrated embodiment, a chronological scheduler (cron) process 302 of the telephony sync 201 is configured to periodically read a cron configuration file 304. The cron configuration file 304 is configured to hold the time at which the cron process 302 is to initiate a time synchronization task 308 to synchronize the client GMT 101 with the master GMT 105.

In one embodiment, the cron configuration file 304 is pre-programmed with a script 305 by a software designer at the time of installation of software files into the telephony application unit 100. In another embodiment, the script 305 is manually input through a graphical user interface (GUI) in the cron configuration file 304. A script is a sequence of commands that activates a set of events under a given situation. Those of ordinary skill in the art will appreciate that various methods of pre-programming or manually inputting a script to activate a program are available.

Once the cron process 302 reads the cron configuration file 304 which indicates the time to initiate a time synchronization task 308, the cron process 302 instructs a clockset process 300 to begin the time synchronization task 308. The clockset process 300 then fetches a client GMT 101 from the operating system 318, which in turn accesses the client GMT 101 from a system clock maintained by a system clock application program interface (API) 320.

The clockset process 300 also fetches the Internet Protocol (IP) address of the master telephony application unit 102 from a host configuration file 310. In one embodiment, the host configuration file 310 is configured to store information on the master telephony application unit 102, including a host IP address 316. In one embodiment, the host configuration file 310 may be updated by a software engineer at the software installation stage or by a user through a GUI in a manner similar to the pre-programming of the cron configuration file 304.

In an alternate embodiment, a remote facility may be added to allow for an application 335 on a remote client 334 to add an entry 311 into the host configuration file 310. The remote client 334 may be any type of computer coupled to the client telephony application unit 100 through a network. The application 335 communicates with a remote configuration process 336 on a client telephony application unit 100. The remote configuration process 336 is activated from an Internet Service Process (not shown) once a connection from the application 335 to a predetermined port of the client telephony application unit 100 is accepted. An Internet Service Process listens for and accepts network connections for specific services and is well known in the art. The remote client 334 then authenticates itself, and if successful, forwards a message containing a line (e.g. entry 311) to be added to the host configuration file 310. In this way, multiple telephony application units can easily be updated without the need for human intervention at every site. A user may also utilize the same feature to remotely set the synchronization task start time in the cron configuration file 304 to a desired value.

Once the host IP address 316 is read, the clockset process 300 transmits a request for a master GMT 105 to the master telephony application unit 102 using the host IP address 316. A fetch of information between computers coupled by a WAN network link using IP addresses is well-known in the art.

Once the master GMT 105 is fetched, the client telephony application unit 100's clockset process 300 updates the client GMT 101 by synchronization with the master GMT 105. In one embodiment, any network latency resulting from the time lapsed between the fetch of the master GMT 105 and the receipt of the master GMT 105 by a client telephony application unit 100 is compensated for by adding a pre-determined offset to the retrieved master GMT 105.

In an alternate embodiment, the clockset process 300 takes the difference between the client GMT 101 before and after the fetch of the master GMT 105. If the difference is greater than a pre-determined minimum value, then the clockset process 300 repeats the process of fetching the master GMT 105 until the difference is at least equal to or less than the pre-determined minimum value. In this embodiment, the clockset process 300 repeats the fetch of the master GMT 105 from the master telephony application unit 102 for a predetermined number of times, after which the fetch is delayed until the next day.

Each time the clockset process 300 initiates the time synchronization task 308, the clockset process 300 also submits an Inter-Process Communication (IPC) message 326 to a logger 328. The logger 328 keeps track of information 330 which notes the events that occur within the telephony application unit 100 as initiated by the clockset process 300 and also notes whether the event was processed successfully. The information 330 is written into a set of files 332 for later use. This feature of the present invention is useful in that any failure to synchronize the client GMT 101 with the master GMT 105 is noted in the set of files 332. Since the cause of such failure is also noted in the set of files 332, the clock synchronization task may be updated as needed by a software designer trouble shooting the system.

Once the master GMT 102 is retrieved, an adjust time process 301 sets the client GMT 101 of a client telephony application unit 100 according to the retrieved master GMT 102. The adjust time process 301 takes a delta value which is the difference between the client GMT 101 and the master GMT 102 as input and adds the delta value to the current client GMT 101. The adjust time process 301 then forwards the synchronized client GMT 101 to the operating system 318. The operating system 318 updates the system clock (local time) according to the synchronized client GMT 101. The distributed computer telephony communication application 110 then utilizes the updated system clock as its time reference. In this way, the distributed computer telephony communication application 110 of a client telephony application unit 100 is ensured to have a time reference equivalent to those of the distributed computer telephony communication applications 110 of other client telephony application units 100$_1$... 100$_n$ in a computer network.

Figure 4:
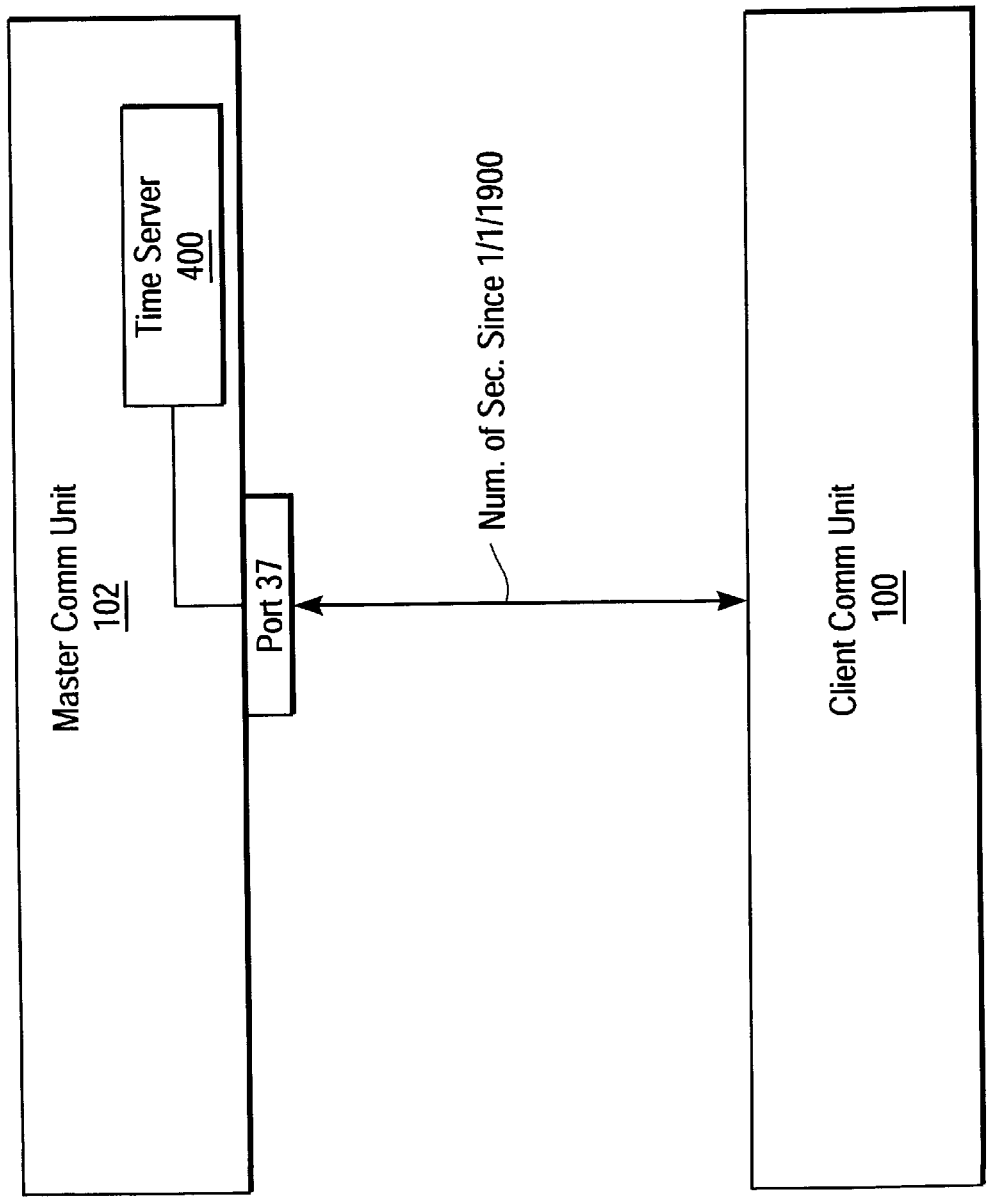
FIG. 4 illustrates an exemplary client telephony application unit in the process of obtaining a master system clock in GMT from a master telephony application unit.

FIG. 4 illustrates an exemplary client telephony application unit 100 in the process of obtaining the master GMT 105 from a master telephony application unit 102 by reading a predetermined communication port.

In one embodiment, the present invention takes advantage of a predetermined read output communication port (port 37) and utilizes the output from the communication port to obtain a master GMT 105 from a master telephony application unit 102. More specifically, most UNIX™ systems come equipped with a communication port 37 which is configured to output the number of seconds since midnight of Jan. 1, 1900. The feature is described in ARPA Internet Time Protocol per RFC 868. The protocol provides a site-independent, machine readable date and time.

The Internet Time Protocol may be used either above the transmission control protocol (TCP) or above the user datagram protocol (UDP). When the protocol is used through a TCP, a time server 400 on the master telephony application unit 102 listens for a connection on the communication port 37 and when the connection is established, the time server 400 returns a 32-bit representation of time and closes the port connection. When the protocol is used through the UDP, the time server 400 listens for a datagram on the communication port 37 and when a datagram arrives, the time server 400 returns a datagram containing the 32-bit time value.

Figure 5:
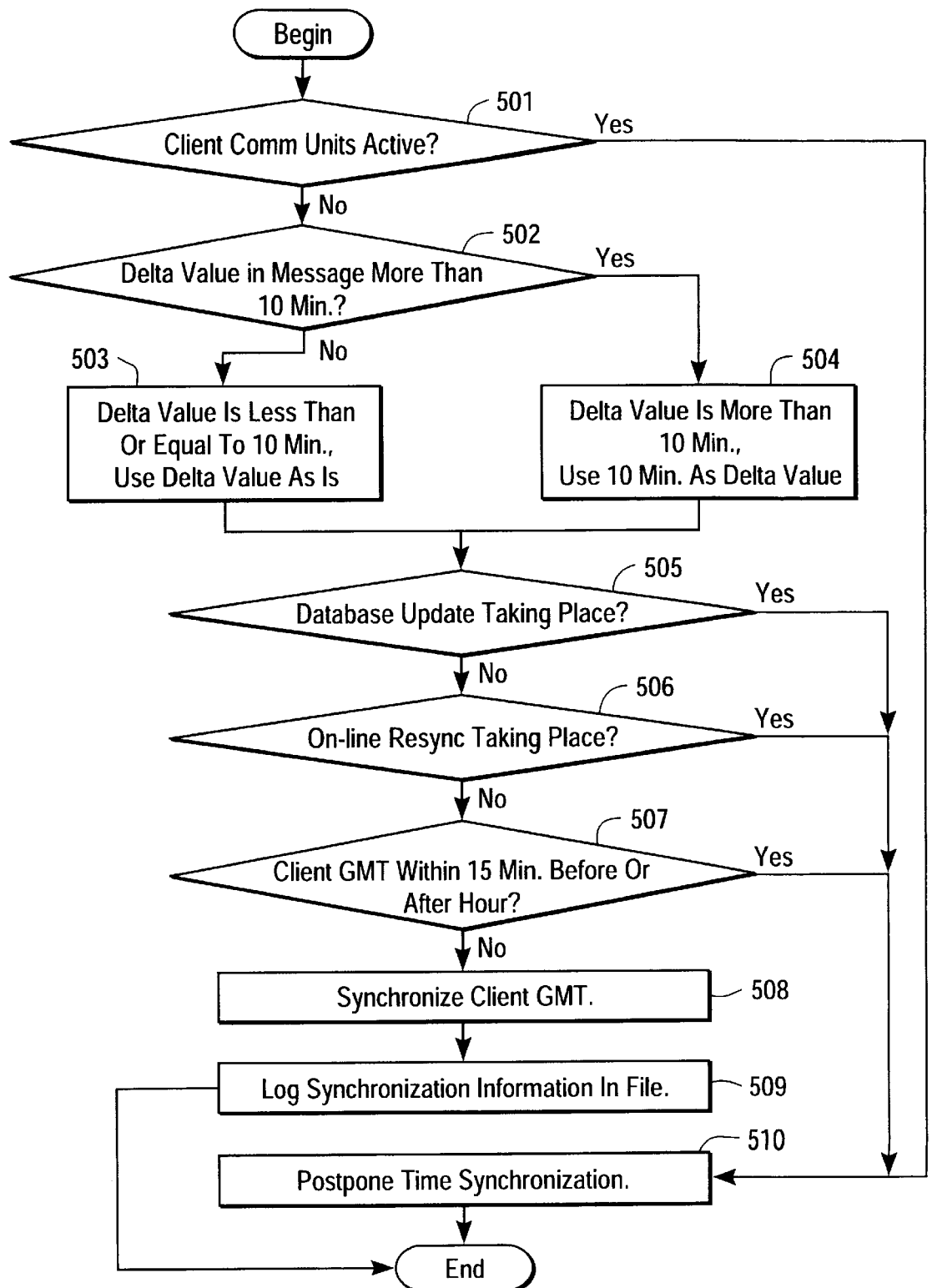
FIG. 5 is an exemplary flow diagram illustrating the general steps followed by the present invention prior to retrieval of a master system clock in GMT from a master telephony application unit.

FIG. 5 is an exemplary flow diagram illustrating the general steps followed by the present invention prior to a master GMT fetch. Various machine states of a client telephone application unit 100 are checked prior to a master GMT fetch. The machine states are checked by accessing the machine state data stored in memory 202 and accessible through an application programming interface (API). Those of ordinary skill in the art will appreciate that various procedures can be used to access a machine state through an API.

In step 501 the clockset process 300 ascertains that the client telephony application unit 100 is active. In step 510, if the client telephony application unit 100 is not active, then the time synchronization task is postponed. The active state of the client telephony application unit 100 is determined by reading its machine state.

In step 502, the clockset process 300 also ascertains that the delta value, which is the difference between the client GMT 101 and the master GMT 102 GMT, is less than a predetermined maximum value such as 10 minutes. In step 503, if the delta value is less than or equal to the predetermined maximum value, for example 10 minutes, then the time synchronization task is performed utilizing the delta value without change. Otherwise, in step 504, if the delta value is more than the predetermined maximum value, such as 10 minutes, then the time synchronization is performed with the delta value equaling the predetermined maximum value, for example of 10 minutes. The delta value to be used for time synchronization is restricted to a predetermined maximum value to ensure that the time synchronization be made without overt time changes which may affect time sensitive processing.

In step 505, the clockset process 300 determines whether a periodic master database update is taking place within the client telephony application unit 100. A periodic master database update includes uploading time stamped telephony data to the master telephony application unit 102 for storage. In step 510, if the periodic master database update is taking place, then the synchronization task 308 is delayed until the completion of the periodic master database update.

In step 506, the clockset process 300 determines whether an on-line re- synchronization is taking place. An on-line resynchronization refers to a predetermined time period during which two telephony application units share the task of supporting function execution. One of the two telephony application unit is considered a primary (or active) system and the other is considered to be a back up system to provide redundancy in supporting certain function execution and prevent lost data caused by the failure of the primary system. The machine state of the client telephony application unit 100 indicating whether an on-line resynchronization is taking place is maintained in memory and is accessible through an API. In step 510, if an on-line resynchronization is taking place, then the time synchronization task 300 is postponed until the next scheduled time synchronization as indicated in the cron configuration file 304. Time synchronization is postponed during an on-line resynchronization to prevent discrepancies in the system clocks of the primary and the back up telephony application units.

In step 507, the clockset process 300 determines whether the client GMT 101 is within fifteen minutes before or after the hour. In step 510, if the client GMT 101 is within fifteen minutes before or after the hour, then the time synchronization task 300 is postponed until such time that the client GMT 101 is not within fifteen minutes before or after the hour.

In step 508, the clockset process 300 then utilizes the client GMT 101 and the delta to obtain a new client GMT 101 value, as will be described in the description accompanying FIG. 6. The clockset process 300 calls adjust time process 301 to update the client GMT 101. In step 509, the results of the time synchronization task 308 are logged in the set of files 332 by a logger 328.

Figure 6:
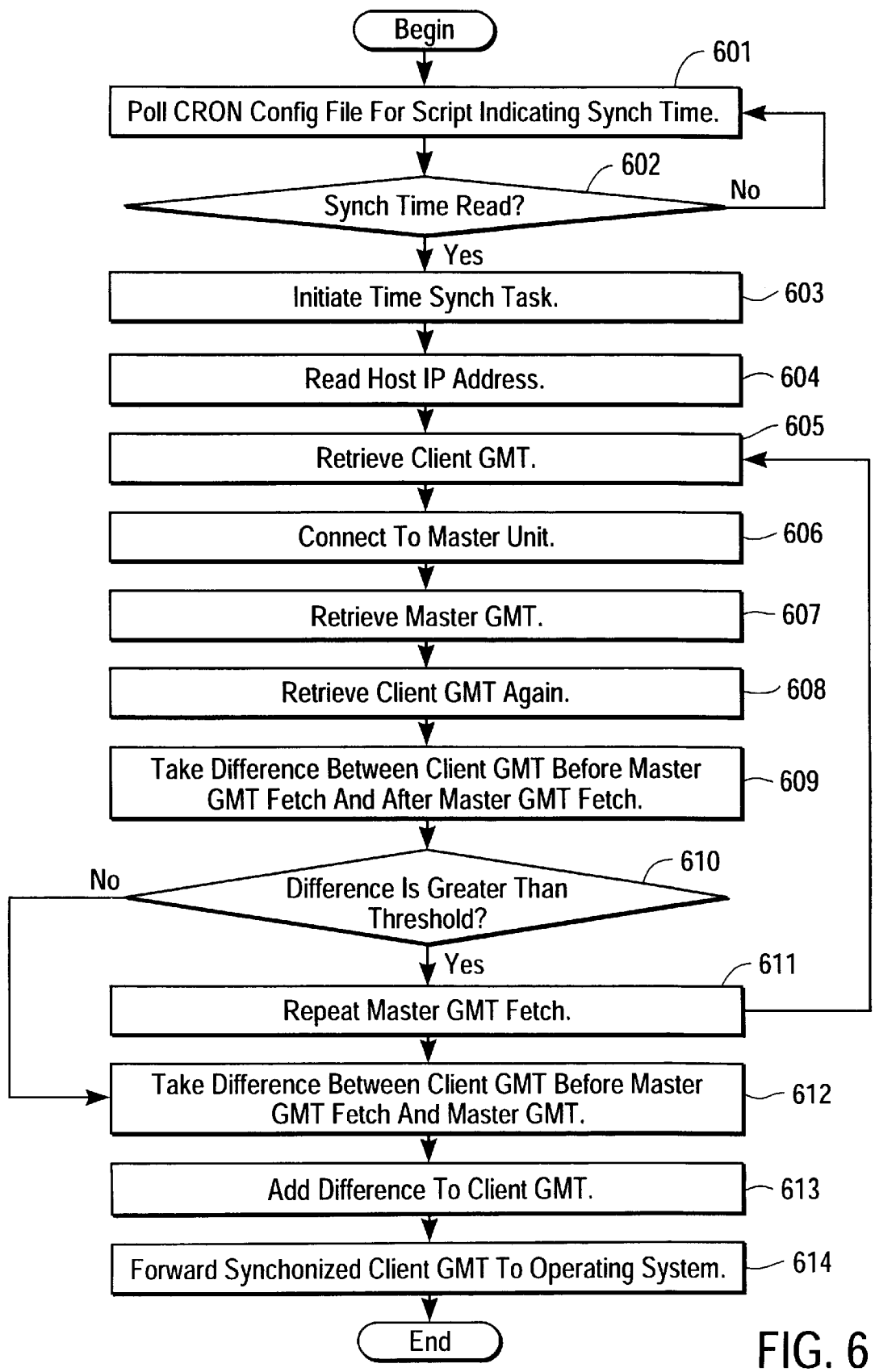
FIG. 6 is an exemplary flow diagram illustrating the general steps followed by the present invention in retrieving a master system clock in GMT and synchronizing a client system clock in GMT.

FIG. 6 is an exemplary flow diagram illustrating the general steps followed by the present invention. The synchronization task 308 may be run by default at a predetermined time every day, or at manually defined times. In step 601, a cron process 302 reads a predetermined location in a cron configuration file 304 for entry indicating the start time to initiate a time synchronization task 308. In step 602, once the cron process 302 reads the start time to initiate the time synchronization task 308, then in step 603, the cron process 302 activates the clockset process 300 to initiate the time synchronization task 308. In step 604, the clockset process 300 retrieves a host IP address 316 from a host configuration file 310.

In step 605, the clockset process 300 retrieves the client GMT 101 from a local operating system 318. In step 606, the clockset process 300 then attempts to connect to the master telephony application unit 102 by utilizing the host IP address 316. In one embodiment, the connection is made through a WAN network link. In step 607, the client telephony application unit 100 retrieves the master GMT 105 from the master telephony application unit 102. In step 608, the clockset process 300 retrieves the client GMT 101.

In step 609, the clockset process 300 takes the difference between the client GMT 101 fetch prior to the master GMT 105 being fetched with the client GMT 101 after the master GMT 105 fetch. In step 610, if the difference is greater than a predetermined maximum threshold, then in step 611, the process returns to step 605 and repeats the fetch of the master GMT 105. In step 612, if the difference is less than or equal to a predetermined maximum threshold, then the difference between the client GMT 101 fetch prior to the fetch of the master GMT 105 and the master GMT 105 fetched is calculated. In step 613, the difference which is a delta value is added to the client GMT 101. In step 614, the synchronized client GMT 101 is used to update local time.

Figure 7:
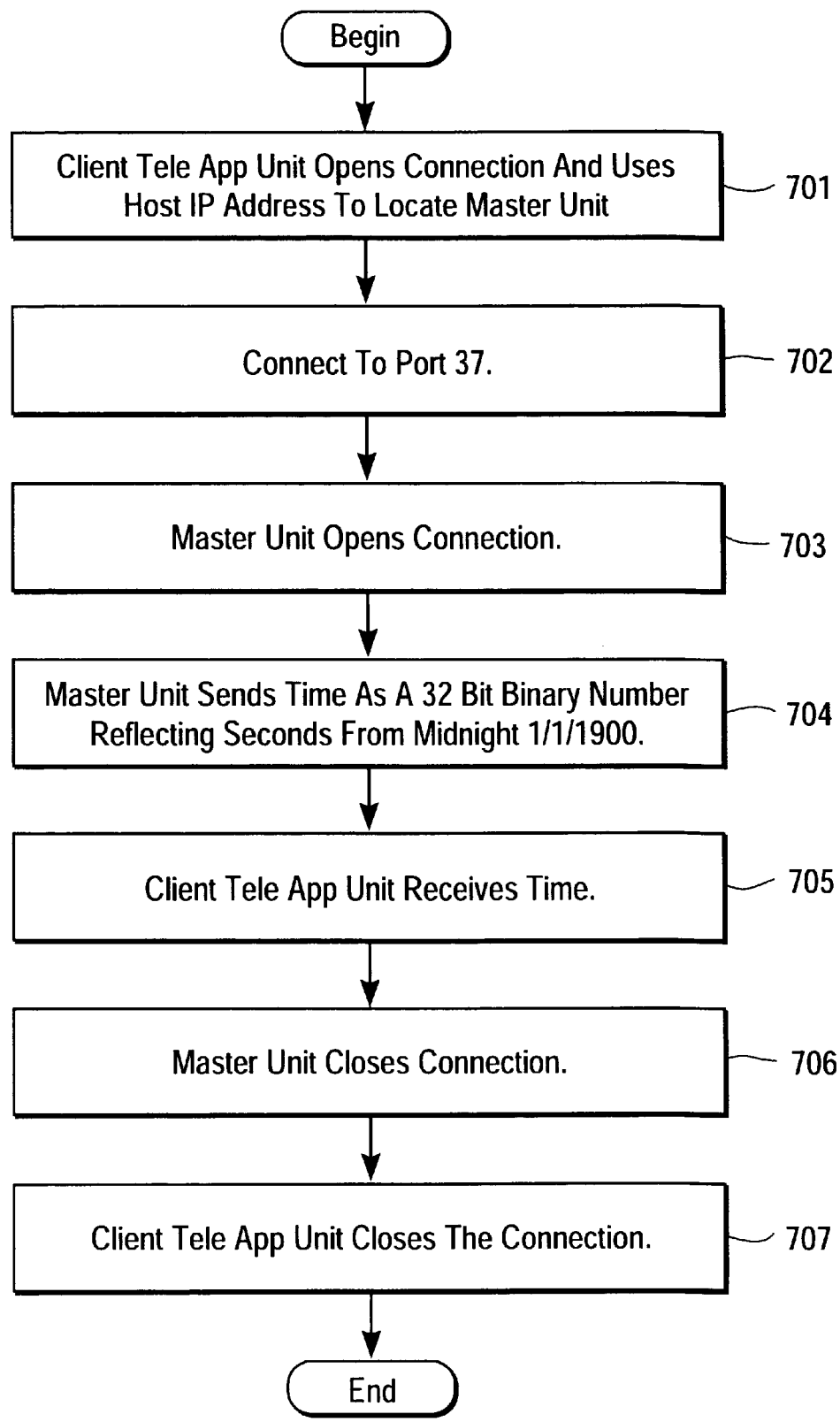
FIG. 7 is a flow diagram illustrating the general steps followed by one embodiment of the present invention in retrieving a master system clock in GMT.

FIG. 7 is a flow diagram illustrating the general steps followed by one embodiment of the present invention in retrieving a master GMT. In step 701, a client telephony application unit 100 opens a connection and locates the master telephony application unit 102 using the master telephony application unit 102's host IP address 316. In step 702, the client telephony application unit 100 locates the master telephony application unit 102. In step 703, the master telephony application unit 102 opens a connection. In step 704, the master telephony application unit 102 transmits a time value as a 32 bit binary number reflecting seconds passed from midnight of Jan. 1, 1900.

In step 705, the client telephony application unit 100 receives the time value. In step 706, the master telephony application unit 102 closes its connection. In step 707, the client telephony application unit 100 closes its connection.

What has been described is a method and apparatus for synchronizing the time of distributed computer telephony communication applications in a computer network.

While certain exemplary embodiments have been described in detail and shown in the accompanying drawings, it is to be understood that such embodiments are merely illustrative of and not restrictive on the broad invention, and that this invention is not to be limited to the specific arrangements and constructions shown and described, since various other modifications may occur to those with ordinary skill in the art.

What is claimed:

1. A method for time synchronization of a plurality of telephony application units in a computer network, the method including:

retrieving a master clock value from a master unit, said master unit being coupled to the plurality of telephony application units; and synchronizing a client clock value of one of a plurality of client telephony application units with said master clock value, said client telephony application unit coupled to said master unit and configured to establish communication between two or more individuals, wherein a difference between first and second client clock values, respectively determined before and after said retrieval of said master clock value, is determined, and wherein said retrieval of said master clock value is repeated if said difference is greater than a predetermined minimum value.

2. The method of claim 1 comprising reading a synchronization start time from a cron configuration file.

3. The method of claim 2 further comprising initiating a time synchronization task in response to said reading said time synchronization start time.

4. The method of claim 3 further comprising reading a host Internet Protocol (IP) address from a host configuration file or an operating system (OS) service.

5. The method of claim 4 further comprising retrieving said client clock value from a system clock application programming interface (API).

6. The method of claim 5 further comprising retrieving said master clock value in seconds from said master telephony application unit utilizing ARPA Internet Time protocol.

7. The method of claim 3 further comprising postponing said time synchronization task if said retrieving said master clock value is repeated for a pre-determined time.

8. The method of claim 7 further comprising determining a delta value by subtracting said client clock value from said master clock value if said difference is less than or equal to said pre-determined minimum value.

9. The method of claim 8 further comprising adding said delta value to said client clock value.

10. The method of claim 9 further comprising logging status of said time synchronization task indicating completion information and cause of failure information if said time synchronization task is postponed.

11. The method of claim 1 comprising reading a synchronization start time from an operating system service.

12. A system for time synchronization of a plurality of telephony application units in a computer network, the system comprising:

a master unit configured to hold a master clock value and being coupled to said plurality of telephony application units; and a plurality of client telephony application units, each configured to establish communication between two or more individuals and being part of said plurality of telephony application units, each said plurality of client telephony application units coupled to said master unit and configured to synchronize a client clock value with said master clock value of said master unit, wherein each of said client telephony application units includes a clockset process to determine a difference between first and second client clock values, respectively determined before and after said retrieval of said master clock value, and to repeat said retrieval of said master clock value if said difference is greater than a predetermined minimum value.

13. The system of claim 12 wherein each clockset process is configured to retrieve said master clock value from said master telephony application unit and synchronize said client clock value of said client telephony application unit with said master clock value.

14. The system of claim 13 wherein said clockset process is coupled to a cron process configured to read a time synchronization start time in a cron configuration file.

15. The system of claim 14 wherein said clockset process is further configured to initiate a time synchronization task in response to said reading said time synchronization start time, retrieve said client clock value from a system clock application programming interface (API).

16. The system of claim 15 wherein said clockset process is coupled to a host configuration file or an operating system (OS) service configured to hold a host Internet Protocol (IP) address, said host IP address read by said clockset process for use in connecting to said master telephony application unit.

17. The system of claim 16 wherein said clockset process is further configured to retrieve said master clock value from said master telephony application unit utilizing ARPA Internet Time protocol.

18. The system of claim 15 wherein said clockset process is further configured to postpone said time synchronization task if said retrieving said master clock value is repeated for a pre-determined time.

19. The system of claim 18 wherein said clockset further comprises an adjust time process configured to determine a delta value by subtracting said client clock value from said master clock value if said difference is less than or equal to said pre-determined minimum value and to add said delta value to said client clock value.

20. The system of claim 19 wherein said clockset process is coupled to a logger configured to log status of said time synchronization task indicating completion information and cause of failure information if said time synchronization task is postponed.

21. A system for time synchronization of distributed computer telephony communication applications, including code configured for storage on a computer-readable apparatus and executable by a computer, the code including a plurality of modules each configured to carry out at least one function to be executed by the computer, the system comprising:

a cron module configured to initiate a time synchronization task for synchronizing a client clock value of a client telephony application unit with a master clock value of a master telephony application unit; and a clockset module coupled to said cron module and configured to retrieve said master clock value from said master telephony application unit and synchronizing said client clock value with said master clock value, wherein said clockset module is to determine a difference between first and second client clock values, respectively determined before and after said retrieval of said master clock value, and to repeat said retrieval of said master clock value if said difference is greater than a predetermined minimum value.

22. The system of claim 21 wherein said cron module is further configured to read a time synchronization start time in a cron configuration file.

23. The system of claim 22 wherein said clockset module is further configured to initiate a time synchronization task in response to said reading said time synchronization start time and retrieve said client clock value from a system clock application programming interface (API).

24. The system of claim 23 wherein said clockset module is coupled to a host configuration file configured to hold a host Internet Protocol (IP) address, said host IP address read by said clockset module for use in connecting to said master telephony application unit.

25. The system of claim 24 wherein said clockset module is further configured to retrieve said master clock value in seconds from said master telephony application unit utilizing ARPA Internet Time protocol.

26. The system of claim 23 wherein said clockset module is further configured to postpone said time synchronization task if said retrieving said master clock value is repeated for a pre-determined time.

27. The system of claim 26 wherein said clockset module further comprises an adjust time module configured to determine a delta value by subtracting said client clock value from said master clock value if said difference is less than or equal to said pre-determined minimum value and add said delta value to said client clock value.

28. The system of claim 27 wherein said clockset module is coupled to a logger module configured to logging status of said time synchronization task indicating completion information and cause of failure information if said time synchronization task is postponed.

* * * * *